United States Patent
Swenson, Jr.

(10) Patent No.: US 6,796,329 B1
(45) Date of Patent: Sep. 28, 2004

(54) COMPACT FLUID PRESSURE CONTROL VALVE SOLENOID WITH PILOT OR GATE VALVE

(75) Inventor: Roger M. Swenson, Jr., Williamsville, MO (US)

(73) Assignee: Trans-A-Matic, Poplar Bluff, MO (US)

( * ) Notice: Subject to any disclaimer, the term of this patent is extended or adjusted under 35 U.S.C. 154(b) by 0 days.

(21) Appl. No.: 10/349,192

(22) Filed: Jan. 23, 2003

Related U.S. Application Data
(60) Provisional application No. 60/349,979, filed on Jan. 23, 2002.

(51) Int. Cl.$^7$ ............................................. F15B 13/043
(52) U.S. Cl. ................................................ 137/625.64
(58) Field of Search ..................................... 137/625.64

(56) References Cited

U.S. PATENT DOCUMENTS

| | | | |
|---|---|---|---|
| 4,676,273 A | * | 6/1987 | Stoltman ................ 137/625.64 |
| 4,998,559 A | | 3/1991 | McAuliffe .............. 137/596.17 |
| 5,076,326 A | | 12/1991 | McCabe ................. 137/625.65 |

FOREIGN PATENT DOCUMENTS

| GB | 2102158 A | * | 1/1983 | ............ 137/625.64 |

* cited by examiner

Primary Examiner—Gerald A. Michalsky
(74) Attorney, Agent, or Firm—Jim Zegeer (57) ABSTRACT

A compact fluid pressure control solenoid valve including a gate valve has outer and inner sleeves. The outer sleeve has ports connected thereto for the admission of pressurized fluid and the delivery of pressurized fluid from the pressure control valve to the work or back to a sump. The inner sleeve has formed therein at least a pair of fluid grooves, and the outer sleeve acting in conjunction with the grooves to form passages for hydraulic fluid flow to and from the gate valve and from main valve chamber. The inner sleeve has a main valving chamber with the gate valve being formed at one end of the main valving chamber.

2 Claims, 8 Drawing Sheets

COMPACT FLUID PRESSURE CONTROL VALVE SOLENOID WITH PILOT OR GATE VALVE

REFERENCE TO RELATED APPLICATION

The present application is the subject of provisional application Ser. No. 60/349,979 filed Jan. 23, 2002 entitled ELECTROMAGNETICALLY-OPERATED FLUID CONTROL VALVE.

BACKGROUND AND BRIEF DESCRIPTION OF THE INVENTION

Electromagnetically-operated fluid control valves are known in the art (see U.S. Pat. Nos. 5,076,326 and 4,998,559 as examples). In U.S. Pat. No. 5,076,326, a typical electromagnetic control valve, the armature of the magnet is coupled to or formed a part of the movable valve element. Such valves are useful for many purposes. They may be used to control a piston, or as disclosed in U.S. Pat. No. 5,076,326 and U.S. Pat. No. 4,998,559, one application has been for the control of the automatic transmission for motor vehicles. Signals from a computer, for example, are converted to the solenoid control signals for rapid and precise control. However, in these patents, as well as others of like genre, the electromagnet used to drive the armature and the control of valving element per se are rather massive, and the armature of the electromagnet is coupled to or formed as a part of the movable valve element.

The object of the present invention is to provide a fluid control valve which is more compact, has a smaller operating coil and wherein the armature of the electromagnet is not coupled to or formed as a part of the movable valve element per se.

The present invention further differs from the prior art in that the spool valve is actuated by hydraulic forces against a spring bias. The controlling hydraulic force is generated by controlling a small gate valve with the electromagnetic force of a small solenoid winding acting on the armature attached to the gate valve. This arrangement allows for a smaller winding because electromagnetic force required to move the small gate valve is much less than the electromagnetic force required if the armature is directly moving the spool valve against the spring force. Moreover, the arrangement allows for a smoother movement of the spool Valve because the control hydraulic flows through a small orifice generating a more gradual movement of the spool valve and the subsequent hydraulic fluid applied to hydraulic actuators which are being actuated. Finally, the arrangement allows for a smaller winding head portion of the solenoid outside of the valve body. The solenoid can be placed in a tighter configuration due to the smaller winding area.

One feature of the invention is that the outer housing is a sleeve which coacts with an inner sleeve having grooves to form hydraulic passages, thereby making the device easier to construct and smaller and more compact. Another feature of the invention is that a small gate valve in one end of the fluid control valve per se is operated by a small electromagnet to control hydraulic the fluid from the pump to actuate the main valve body against the spring pressure, the spring pressure always tending to close the valve.

Thus, the invention features a compact fluid pressure control valve solenoid including a gate valve comprising: outer and inner sleeves, said outer sleeve having ports connected thereto for the admission of pressurized fluid and the delivery of pressurized fluid from said pressure control valve to the work or back to a sump. The inner sleeve has formed therein at least a pair of fluid grooves, the outer sleeve acting in conjunction with said grooves in said inner sleeve to form passages for hydraulic fluid flow to said gate valve and from said main valve chamber.

The inner sleeve has a main valving chamber with the gate valve being formed at one end of the valving element chamber. A main valving element is in the main valving chamber. A main spring biases the main valving element closed with the removal of fluid from the main valving chamber through a vent port in the main valving chamber. A solenoid winding has an armature coupled to the gate valve element, a gate spring member biasing said gate valve element closed when said winding is deenergized. The main valve element has a piston head therein and arranged so that when said solenoid is energized, said gate valve opens to apply pressurized fluid to said piston head and open said main valving element and pass pressurized fluid to said work. The gate spring acting when said solenoid is deenergized to close said gate valve through the vent channel connected to said main valve chamber, thereby releasing the pressure on said main spring and thereby close the valve by moving the main valve element to a closed position.

BRIEF DESCRIPTION OF THE DRAWINGS

The above and other objects, advantages and features of the invention will become more apparent when considered with the following specification and accompanying drawings wherein:

FIGS. 2A—2D illustrates passage-forming grooves cut in the surface thereof of the inner sleeve which coact with the outer sleeve to form passages for the flow of hydraulic fluid according to the invention.

DETAILED DESCRIPTION OF THE INVENTION

Figure 1A:
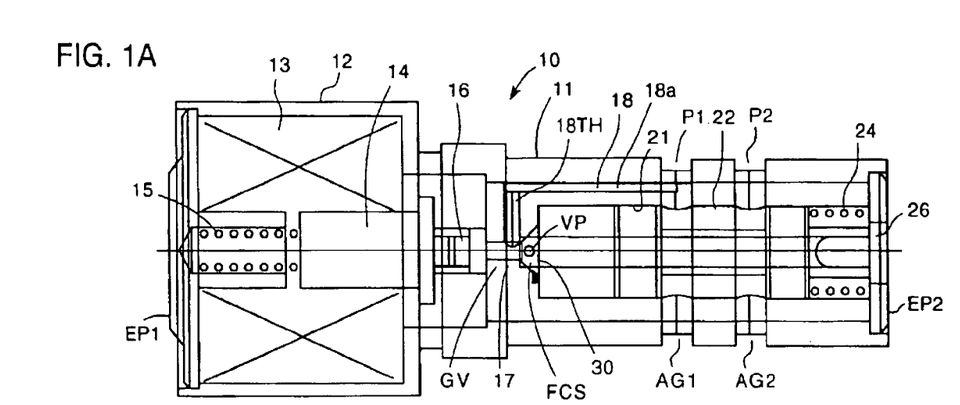
FIGS. 1A and 1B are diagrammatic views of the fluid operated valve incorporating the invention, FIG. 1B being the same device of FIG. 1A turned or rotated on its axis 90°.
Figure 1B:
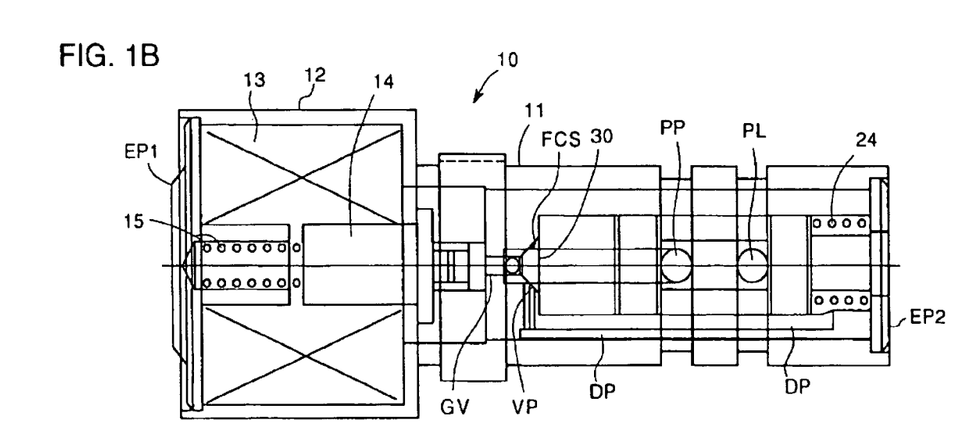
Figure 2A:
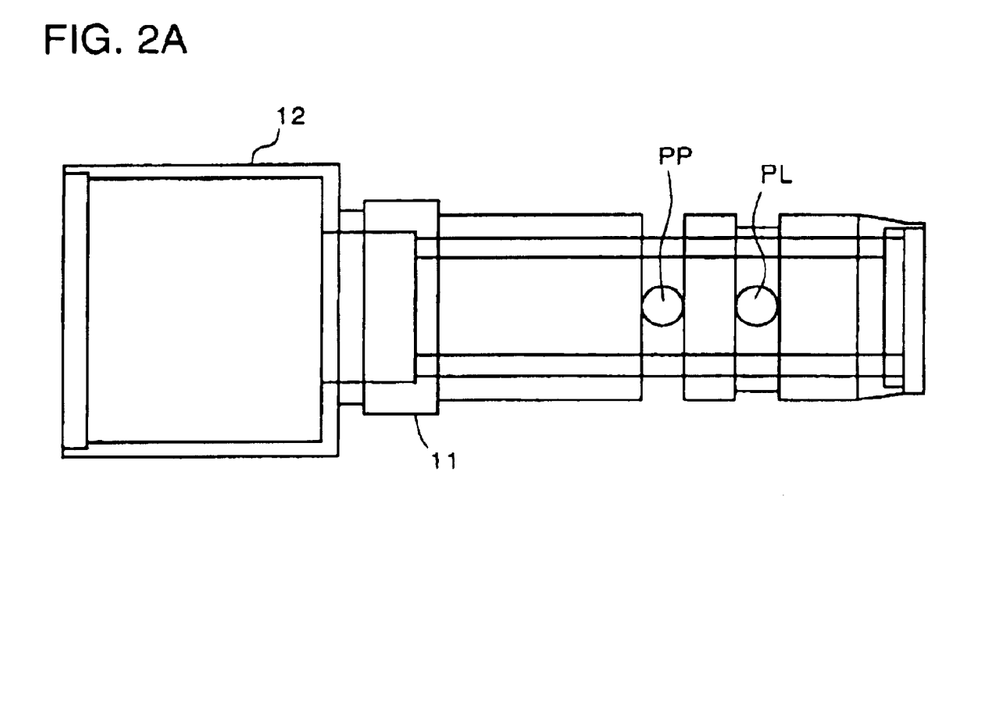
FIG. 2A is a side elevational view of the outer sleeve and FIG. 2B is a sectional view through lines B—B of FIG. 2A.
Figure 2B:
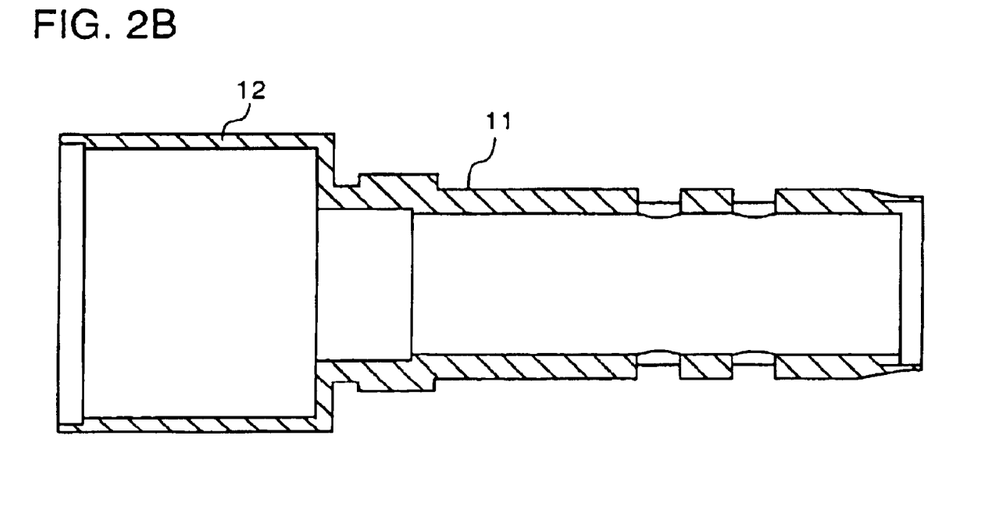
Figures 2C, 2G:
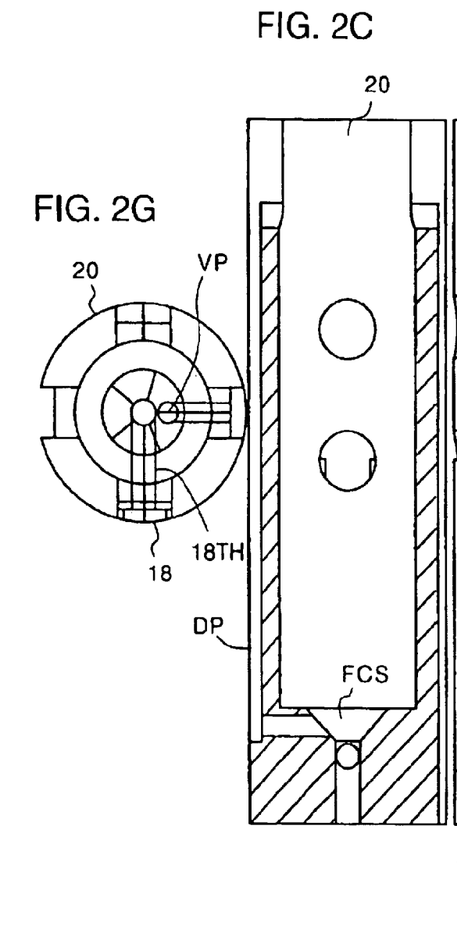
FIG. 2C is a sectional view of the inner sleeve.
FIG. 2G is a section through through hole 18TH of FIG. 2D.
Figure 2D:
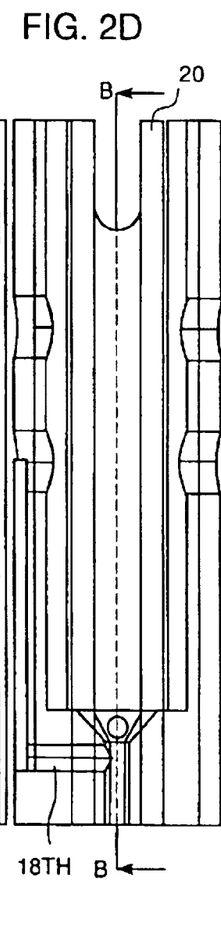
FIG. 2D is a sectional view on lines 2D—D.
Figure 2E:
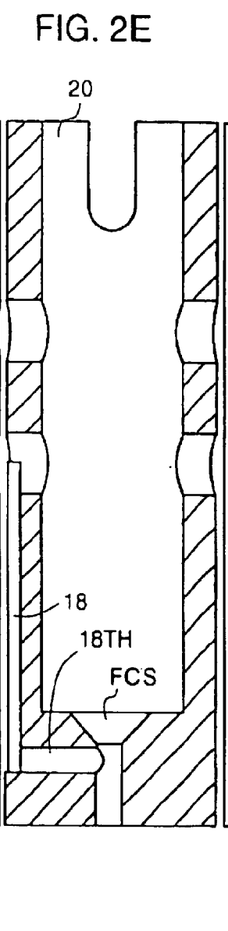
FIG. 2E is a sectional view of the outer sleeve.
Figure 2F:
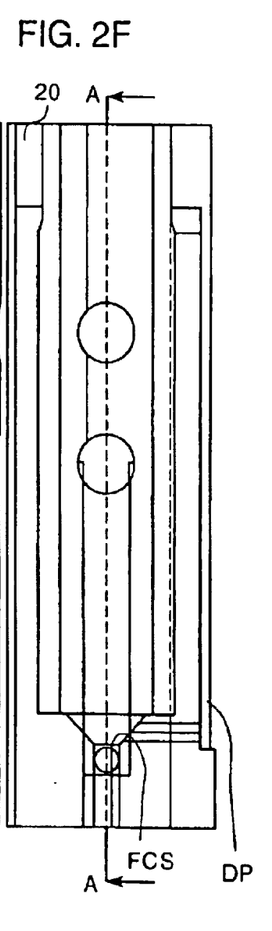
FIG. 2F is the reverse side of FIG. 2C.
Figure 3A:
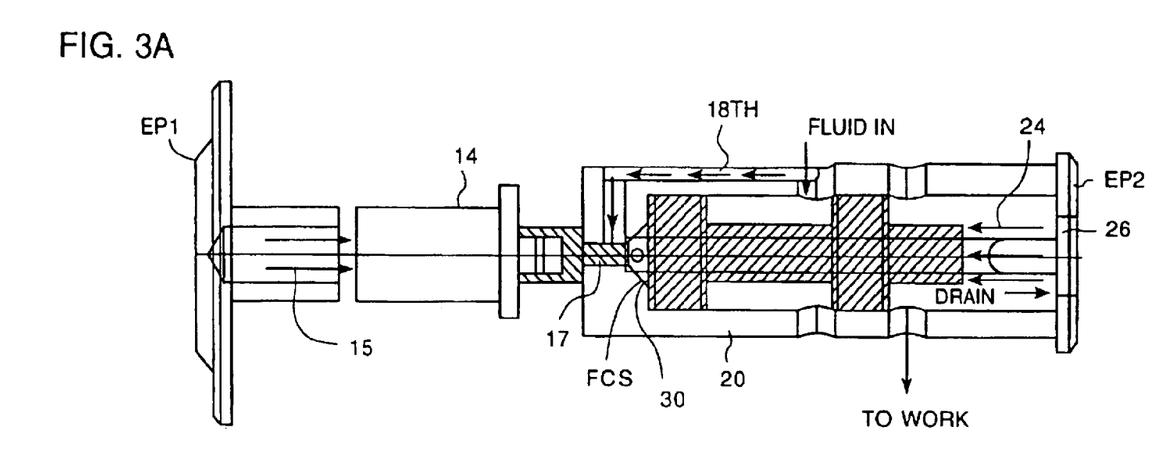
FIGS. 3A, 3B and 4A, 4B are sectional views of the fluid operated valve incorporating the invention, FIGS. 4A and 4B being the same as FIGS. 3A and 3B turned on its axis 90° and showing the valve assembly in a deenergized state (outer sleeve removed)
Figure 3B:
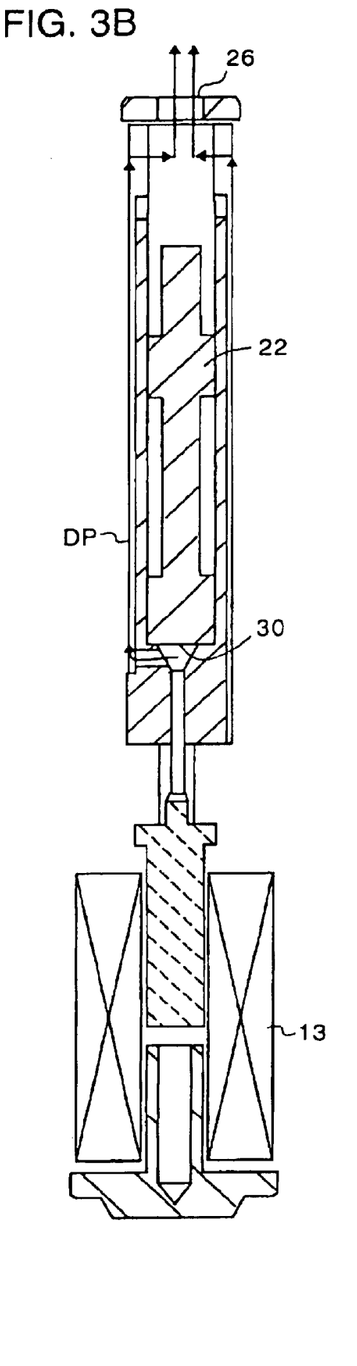
Figure 4A:
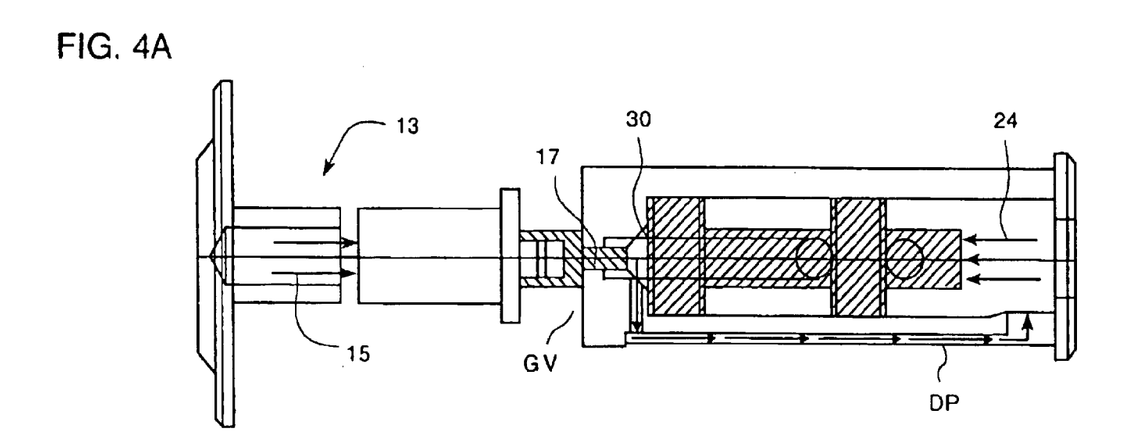
Figure 4B:
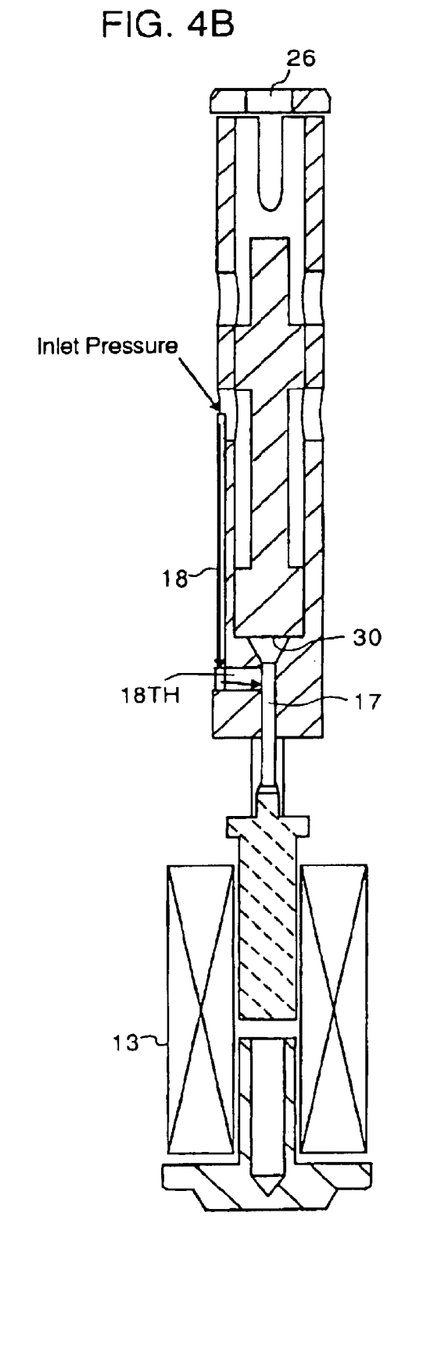
Figure 5A:
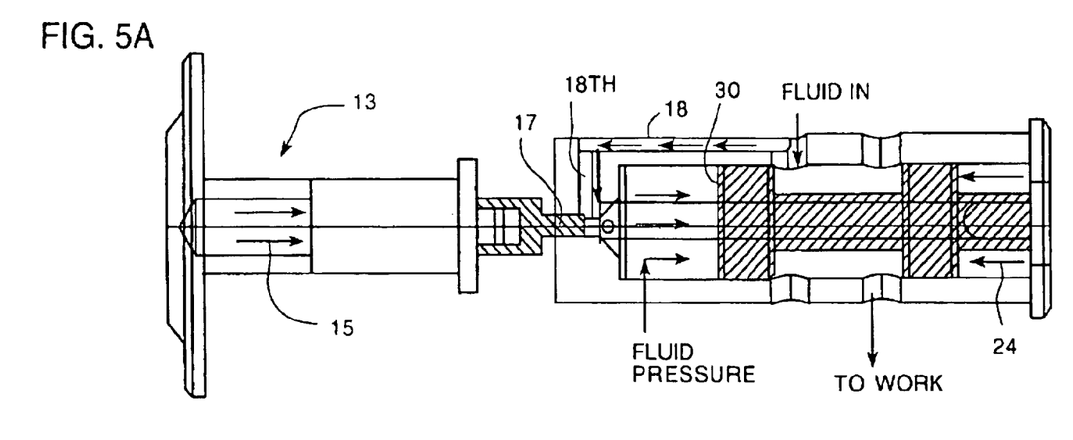
FIGS. 5A and 5B and 6A and 6B are sectional views of the fluid control valve incorporated the invention, FIGS. 6A and 6B being the same as FIGS. 5A and 5B turned 90° on its axis and both views showing the valve in its energized state (outer sleeve removed)
Figure 5B:
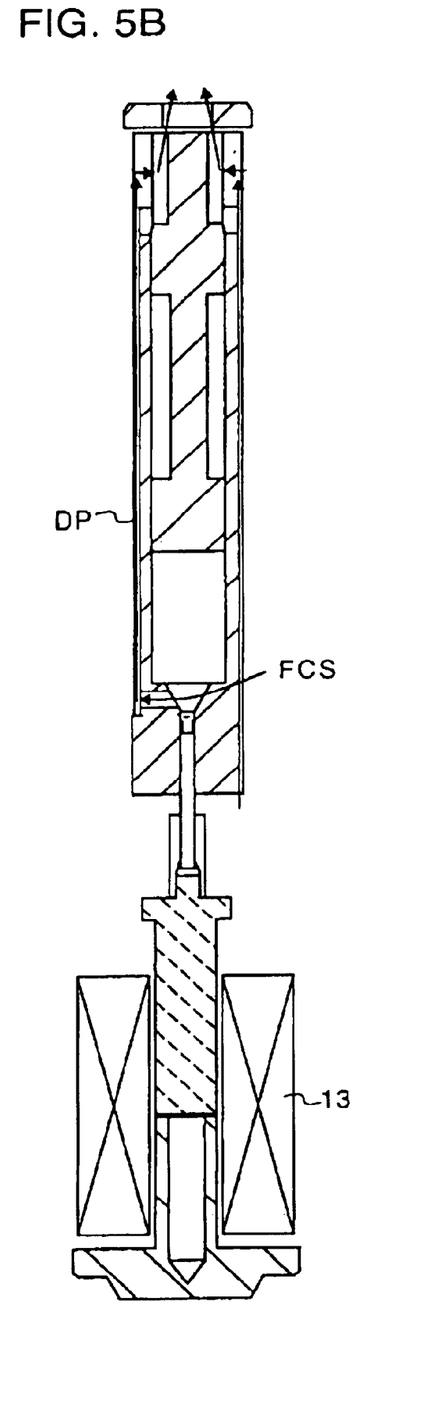
Figure 6A:
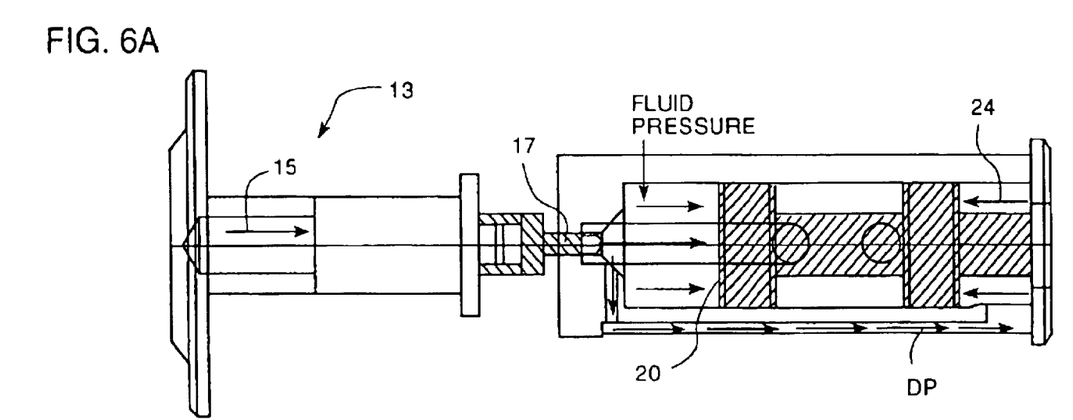
Figure 6B:
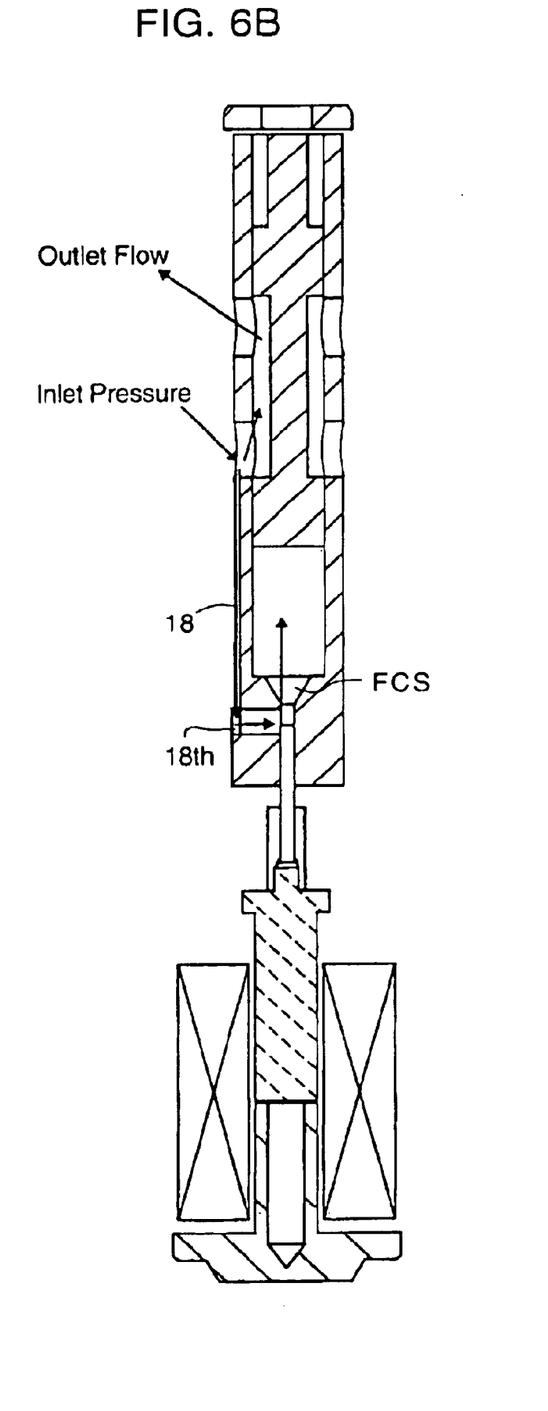
Figure 7:
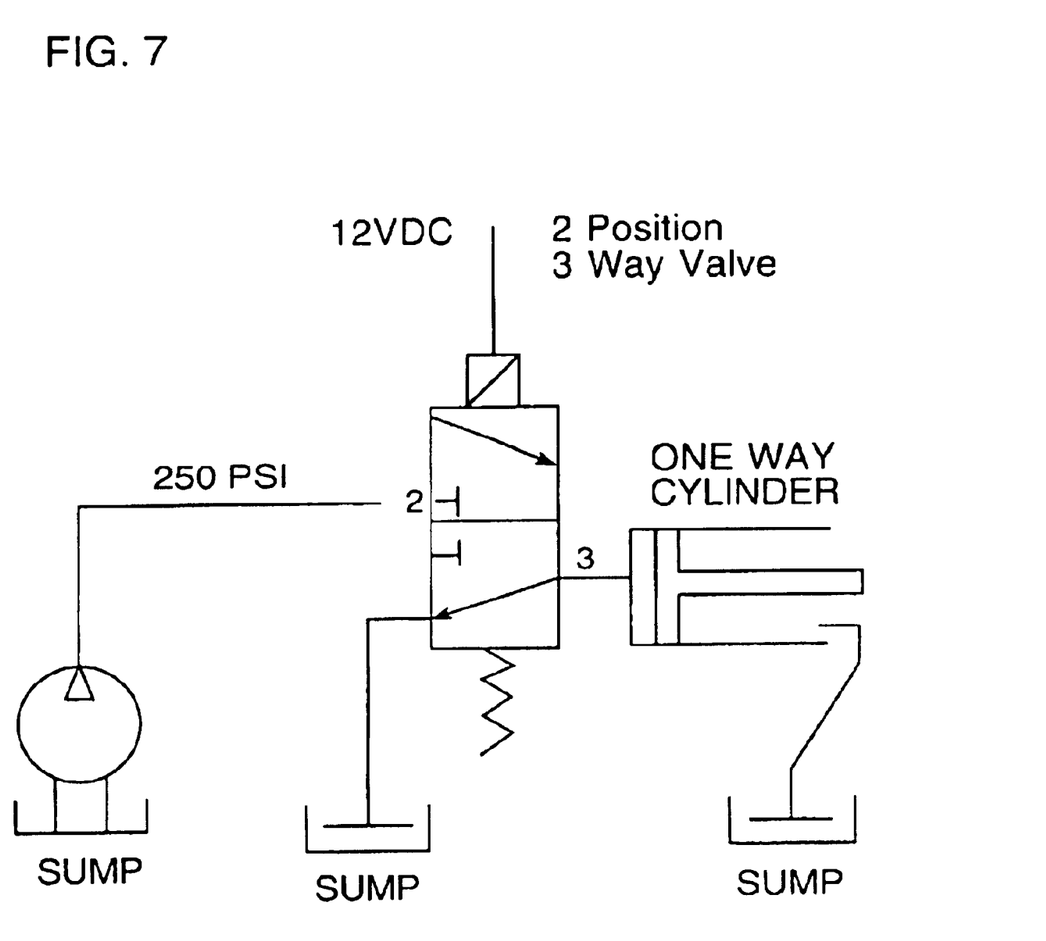
FIG. 7 is an hydraulic circuit diagram which discloses the invention in one particular use embodiment.

Referring now to the drawings, this embodiment of the invention is particularly adapted for driving hydraulic pistons in a hydraulic circuit such as shown in FIG. 7. Referring initially to FIGS. 1A and 1B, a compact fluid pressure control valve solenoid including a gate valve is designated as 10 and includes an outer sleeve housing 11 shown in sectional view in FIGS. 2A and 2B. It is provided with ports PP and PL for the admission of pressurized fluid and delivery of pressurized fluid from the pressure control valve to the work PL or back to the sump via end port EP. Conventional annular grooves AG1 and AG2 allow fitment to other apparatus. As shown in FIGS. 1A and 1B, the outer sleeve 11 includes a solenoid housing end 12 for housing a solenoid coil 13 which has conventional leads thereto (not shown). An armature 14 is biased (to the right in the view shown in FIGS. 1A and 1B) by a spring 15. Solenoid armature 14 has a connection 16 to a gate valving element 17. The inner sleeve 20 has a main valving chamber 21 and a main valving element 22 which is biased to a close or shut spring by main valving element bias spring 24 which biases the main valving element closed and allows removal of the fluid from the main valving chamber through a vent port 26. The main valve element has a piston head 30 formed in the end thereof.

Gate valve GV is coupled to the source of pressurized fluid via passage 18 and through hole 18TH. The frusto-conical space FCS receives pressurized fluid via passage 18 and through passage 18TH. The gate valve element 17 closes off the passage 18TH. Whenever the solenoid coil 13 is energized, it moves the armature and gate valve element 17 to the left against the bias of spring 15 which, in all cases, when the solenoid is deenergized, maintains the gate valve GV closed. The fluid operating the gate valve piston head 30 is drained or vented through vent hole VH in the side of the frusto conical chamber FCS which has a drain passage DP.

The outer sleeve 11 has ports P1, P2 connected thereto for the admission of pressurized fluid and delivery of pressurized fluid from the control valve to the work (a piston, for example) and back to a sump as shown in the schematic diagram of FIG. 7. The inner sleeve as shown in FIGS. 2A–2D has grooves G1, G2 formed therein which, in conjunction with the outer sleeve forms passages (18 and DP) for the hydraulic fluid flow to and from the gate valve GV and from the main valve chamber.

End pieces EP1 and EP2 for the solenoid housing and the right end of the assembly, respectively, are swaged in place by swaging the ends of the solenoid housing 12E onto end piece EP1 and swaging the right end of the outer sleeve RE on the end cap or end piece EP2. End piece EP2 has an opening to allow venting of fluid to the sump.

In summary, referring to FIGS. 3A–6A as a group, the solenoid winding 13, when energized, actuates an armature 14 which is coupled to a smaller gate valve assembly GV. As shown in the drawings, when the gate valve GV is open, gate valve element 17 moves to the left, solenoid spring 15 is compressed, and the fluid pressure is introduced into the frusto- conical valve chamber FCS which acts on the spool valve piston head 30 to shift to the main spool valve element 22 to the right which compresses valve spring 24. This allows fluid from the fluid pump to flow through the valve body to the work which may be a hydraulic cylinder, actuator or motor. When the solenoid is deactivated or deenergized, spring pressure from spring 24 thereby closes the valve by moving the main valve element to the position shown in FIGS. 1A and 1B.

Thus, there has been provided a compact fluid pressure control valve solenoid comprised of inner and outer sleeves, the outer sleeve having ports connected thereto for admission of pressurized fluid and delivery of pressurized fluid from the pressure control valve to the work or back to the sump. The inner sleeve has formed therein at least a pair of fluid grooves which act in conjunction with the outer sleeve to form passages for the hydraulic fluid flow to the gate valve and/or from the main chamber. The inner sleeve has a main valving chamber with a gate valve formed in one end of the main valving chamber. A main valving element is in the main valving chamber, and it is biased by a main spring biasing the main valving element closed with removal of fluid from the main valving chamber being through the vent port in the main valving chamber. The solenoid winding has an armature coupled to the gate valve element and a gate spring member biases the gate valve element closed when the winding is deenergized. The main valve element has a piston head formed therein, and it is arranged so that when the solenoid is deenergized, the gate valve opens to apply pressurized fluid to the piston head and open the main valving element and pass pressurized fluid to the work. The gate spring acts when the solenoid is deenergized to close the gate valve through the vent channel connected to the main valving chamber thereby releasing pressure on the main spring and thereby it to close by moving the valve element to a closed position.

While the invention has been described in relation to preferred embodiments of the invention, it will be appreciated that other embodiments, adaptations and modifications of the invention will be apparent to those skilled in the art.

What is claimed is:

1. A compact fluid pressure control valve solenoid including a gate valve comprising: outer and inner sleeves, said outer sleeve having ports connected thereto for the admission of pressurized fluid and the delivery of pressurized fluid from said pressure control valve to the work or back to a sump, said inner sleeve having formed therein at least a pair of fluid grooves, said outer sleeve acting in conjunction with said grooves in said inner sleeve to form passages for hydraulic fluid flow to said gate valve, and from said valve chamber, said inner sleeve having a main valving chamber, said gate valve being formed at one end of said main valving chamber, a main valving element in said main valving chamber, a main spring biasing said main valving element closed with the removal of the fluid from said main valving chamber through a vent port in said main valving chamber, a solenoid winding having an armature coupled to said gate valve element, a gate spring member biasing said gate valve element closed when said winding is deenergized, said main valve element having a piston head therein and arranged so that when said solenoid is energized, said gate valve opens to apply pressurized fluid to said piston head and open said main valving element and pass pressurized fluid to said work, said gate spring acting when said solenoid is deenergized to close said gate valve with the removal of fluid through the vent channel connected to said main valve chamber, thereby releasing the pressure on said main spring and thereby close said valve by moving said main valve element to a closed position.

2. A compact fluid pressure control valve solenoid including a gate valve comprising: outer and inner sleeves, said outer sleeve having ports connected thereto for the admission of pressurized fluid and the delivery of pressurized fluid from said pressure control valve to the work or back to a sump, said inner sleeve having formed therein at least a pair of fluid grooves, said outer sleeve acting in conjunction with said grooves in said inner sleeve to form passages for hydraulic fluid flow to said gate valve, and from main valve chamber, said inner sleeve having a main valving chamber, said gate valve being formed at one end of said main valving chamber, a main valving element in said main valving chamber, a main spring biasing said main valving element closed with the removal of the fluid from the main valving chamber through a vent port in the main valving chamber, a solenoid winding having an armature coupled to said gate valve element, a gate spring member biasing said gate valve element closed when said winding is deenergized, said main valve element having a piston head therein and arranged so that when said solenoid is energized, said gate valve opens to apply pressurized fluid to said piston head and open said main valving element and pass pressurized fluid to said work, said gate spring acting when said solenoid is deenergized to close said gate valve with the removal of fluid through the vent channel connected to said main valve chamber, thereby releasing the pressure on said main spring and thereby close the valve by moving the main valve element to a closed position.

* * * * *